United States Patent [19]

Smith

[11] Patent Number: 5,400,894

[45] Date of Patent: Mar. 28, 1995

[54] PRODUCTION LINE ACCUMULATOR

[75] Inventor: Brenton L. Smith, Alexandria, Minn.

[73] Assignee: Brenton Engineering Co., Alexandria, Minn.

[21] Appl. No.: 209,298

[22] Filed: Mar. 14, 1994

[51] Int. Cl.$^6$ ............................................. B65G 1/00
[52] U.S. Cl. .................... 198/347.2; 198/429; 198/468.9
[58] Field of Search ............... 198/347.1, 347.2, 347.3, 198/429, 468.9

[56] References Cited

U.S. PATENT DOCUMENTS

| | | | |
|---|---|---|---|
| 3,499,555 | 3/1970 | Wahle | 198/347.3 |
| 4,711,336 | 12/1987 | Mattei | 198/347.3 |
| 5,255,773 | 10/1993 | Pollock | 198/347.3 |
| 5,304,027 | 4/1994 | La Barre et al. | 198/347.2 |

FOREIGN PATENT DOCUMENTS 5-40905  5/1993  European Pat. Off. ......... 198/347.3

*Primary Examiner*—Cheryl Gastineau
*Attorney, Agent, or Firm*—Herman H. Bains

[57] ABSTRACT

An accumulator apparatus for accumulating product from a production line conveyor when a downstream stoppage occurs includes cylindrical compartmented rotary drum having a plurality shelves for supporting product thereon. A loading mechanism loads product from the conveyor upon each drum shelf when the downstream stoppage occurs. An unloading mechanism unloads product from each shelf of the drum when the downstream stoppage problem has been resolved.

5 Claims, 3 Drawing Sheets

PRODUCTION LINE ACCUMULATOR

BACKGROUND OF THE INVENTION

1. Field of the Invention

This invention relates to an accumulator for a production line which accepts and accumulates product when there is a downstream stoppage.

2. Discussion of Prior Art Systems

In conventional production lines, product is conveyed from a source to a discharge point where the product may be further processed or packaged. Occasionally, a downstream stoppage will occur which interrupts the smooth flow of product from the source to the discharge point.

Accumulator systems have been employed in conventional production lines for temporarily accumulating product from the pass through conveyor until the downstream stoppage problem has been resolved. However, none of these accumulator systems use a cylindrical type drum accumulator having shelves for accumulating the product from the pass through conveyor, and for quick efficient return of the product to the pass through conveyor.

SUMMARY OF THE INVENTION

It is an object of this invention to provide a novel accumulator for use with a production line pass through conveyor wherein the product is temporarily accumulated and stored in a cylindrical drum during a downstream stoppage and thereafter returned when the stoppage has been resolved.

A more specific object of this invention is the provision of a cylindrical compartmented drum accumulator which includes a positioning mechanism for precisely positioning the drum for efficient and smooth product loading and product unloading with respect to a pass through conveyor.

The accumulator comprises a rotatable cylindrical drum having a plurality of outwardly opening similar shelves which receive and accumulate product from a pass through conveyor when a work stoppage occurs. A load pusher assembly and an unload pusher assembly are provided for loading and unloading the compartmented accumulator drum. A ball detent positioning mechanism coacts with the inner end edges of a pair of product shelves to precisely locate each successive shelf for loading and unloading to and from the pass through conveyor. The entire apparatus including the drive for the accumulator drum, the pass through conveyor, the load pusher assembly and unload pusher assembly are powered by only two electric motors.

DESCRIPTION OF THE PREFERRED EMBODIMENT

Figure 1:
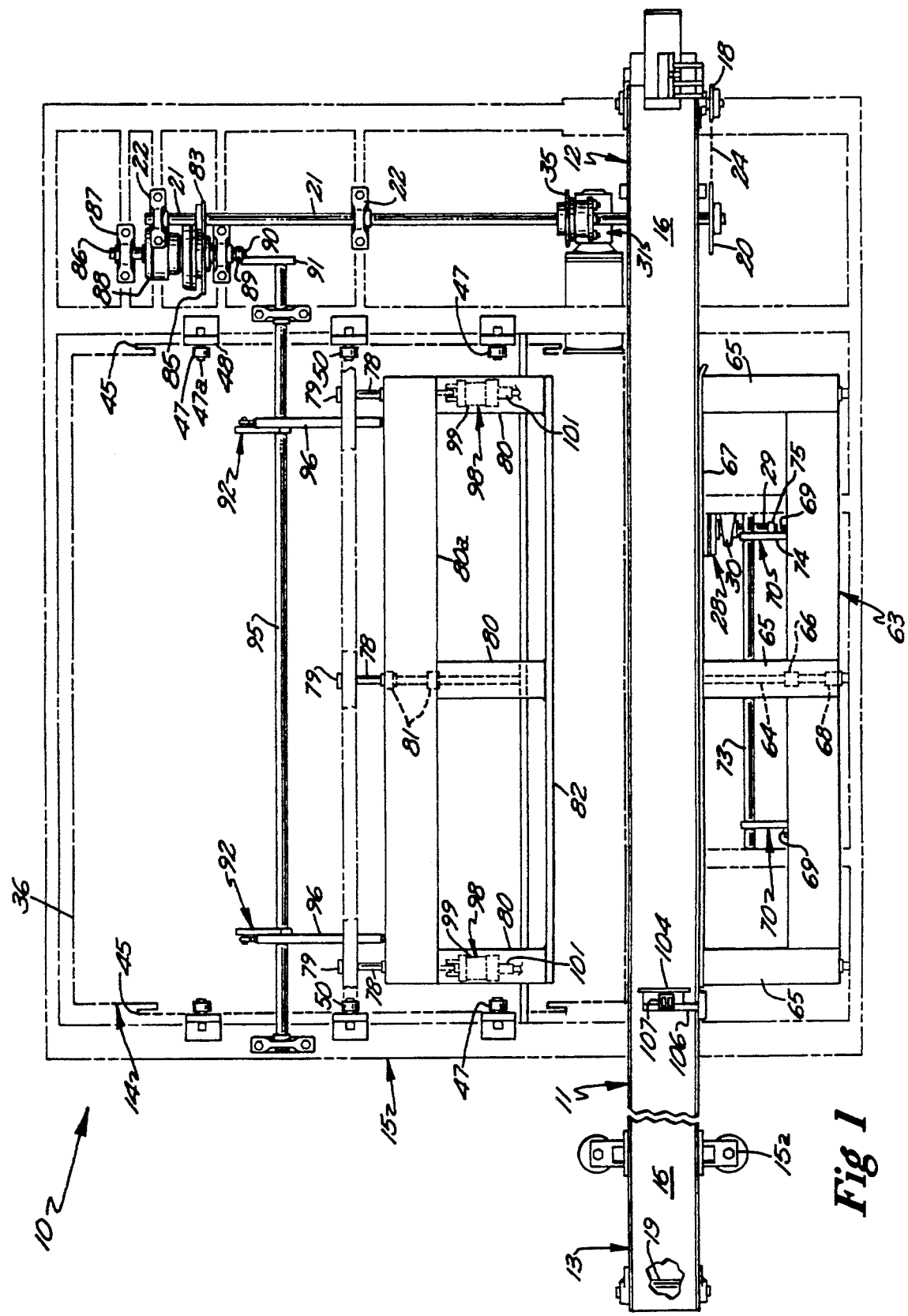
FIG. 1 is a top plan view of the accumulator apparatus.

Referring now to the drawings and more specifically to FIG. 1, it will be seen that one embodiment of the novel accumulator apparatus, designated generally by the reference numeral 10, is thereshown. The accumulator apparatus includes an elongate pass through conveyor 11 having an upstream end portion 12 and a downstream end portion 13. The pass through conveyor conveys product P from a source of such a product in a downstream direction to a discharge point. The product may be any one of various number of product types including box type packages as illustrated in FIG. 1 which may contain food or other kinds of items.

The accumulator apparatus includes a cylindrical accumulator drum 14 which is mounted closely adjacent the pass through conveyor 11. The accumulator drum 14 is rotated about its central axis which is disposed in substantially parallel relation with respect to the direction of movement of the pass through conveyor. The accumulator drum 14 and the pass through conveyor 11 as well as all the other components of the accumulator apparatus are supported on a support frame 15 comprised of a plurality of vertical, horizontal and transverse frame elements.

The pass through conveyor 11 includes an elongate endless conveyor belt 16 which is trained about a drive roller 17 having a sprocket 18 secured to the axle thereof. The conveyor belt 16 is also trained about an idler roller 19 located at the downstream end of the conveyor. Leg members 15a support the downstream end portion of the pass through conveyor 11.

A sprocket 20 is secured to one end of an elongate shaft 21 which is journaled in spaced apart pillow block bearings 22 secured to a horizontal frame element 23. An endless chain 24 is trained about the sprockets 18 and 20 whereby when the shaft 21 is rotated, the pass through conveyor 11 will be driven.

The shaft 21 also has a sprocket 25 keyed thereto and axially spaced from the sprocket 20. An endless chain 26 is trained about the sprocket 25 and is also trained about a sprocket 27 of a clutch-brake mechanism 28 keyed to a shaft 29. The shaft 29 is disposed in parallel relation with respect to the shaft 21 and is journaled in suitable pillow block bearings 30 mounted on suitable frame elements of the support frame 15. It will be noted that the shaft 29 is positioned below the shaft 21.

The power for operating the pass through conveyor is a standard AC one horsepower motor and gear drive assembly 31 which is mounted on a suitable frame element of the support frame and which is provided with an output shaft 32. A sprocket 33 is keyed to the output shaft 32 for rotation therewith. An endless chain 34 is trained about sprocket 33 and is also trained about a sprocket 35 also keyed to the shaft 21. With this arrangement, when the motor gear box assembly 31 is energized, the shaft 21 will be rotated to drive the pass through conveyor and this torque will be transmitted via the chain 26 to the shaft 29.

Referring now to the accumulator drum 14, it will be seen that the drum includes a pair of annular end plates 36 which are secured to a plurality of substantially identical accumulator shelves 37 by suitable bolts 38. It will be noted that the shelves 37 are arranged in cylindrical fashion throughout the circumference of the drum and actually define the cylindrical configuration of the drum.

Figure 3:
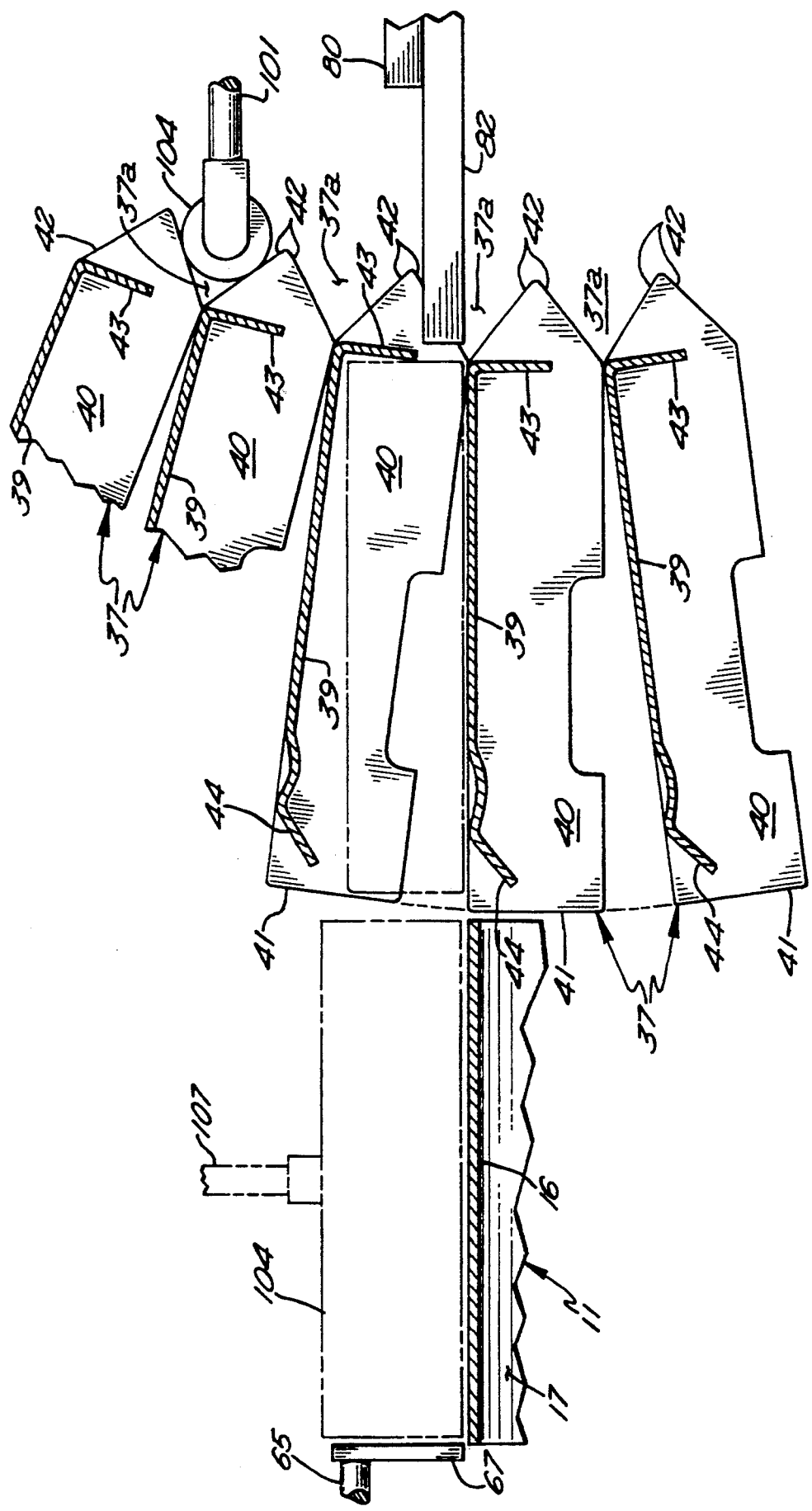
FIG. 3 a diagrammatic fragmentary cross-sectional view of the drum and conveyor illustrating certain components of the accumulator apparatus.

Referring now to FIG. 3, it will be seen that each shelf 37 includes a substantially planar or flat transverse wall 39 having a pair of substantially flat side walls 40 rigidly secured thereto. It will be noted that one side wall for each shelf is secured to one of the end plates 36.

It will also be noted that the side walls 40 each has a substantially straight front edge 41 and pointed rear end edges 42 formed by the converging upper and lower edges of the side walls. The transverse wall 39 for each shelf has a downturned lip 43 at its rear end and has a slightly downwardly flared front lip 44. In the embodiment shown, each product shelf is capable of supporting a plurality of product items thereon when the accumulator drum is used to accumulate product during a downstream stoppage. It will also be noted that the outwardly facing opening (facing the pass through conveyor) is substantially greater than the thickness dimension of the product P. This is obviously so because of the slightly outward divergence of adjacent shelves 37.

Each end of the accumulator drum 14 is provided with one of a pair of large sprockets 45, each sprocket being secured to the adjacent end plate 36 by bolts. Each sprocket 45 has an inner circular edge 46 which is engaged by an upper pair of rollers or cam followers 47. Each of the upper rollers 47 at one end of the drum has its axle shaft 47a journaled on a bracket 48 secured to a transverse frame element 49. It will be noted that the upper rollers 47 are spaced apart and engage the inner edge 46 of the sprockets adjacent the upper portions thereof. Lower rollers or cam followers 50 have an axle shaft 50a journaled on brackets 51 secured to a frame element 23 for each sprocket 45. The lower roller for each sprocket engages and is disposed above inner circular edge. With this arrangement, the accumulator drum is mounted for rotation during the accumulation operation. As pointed out above, the rotational axis of the drum is disposed substantially parallel to the direction of travel of the pass through conveyor.

One of a pair of endless chains 52 are trained about one of a pair of spaced apart sprockets 53 keyed to a shaft 54. The shaft 54 is journaled on suitable bearings 55 mounted on frame elements of the support frame 15. It will be seen that when the shaft 54 is rotated, the drum 14 will be rotated via the chains 52.

A sprocket 56 is also keyed to the shaft 54 and an endless chain 57 is trained about the sprocket 56 and about a sprocket 58 secured to the output shaft 59 of a motion control motor and gear box assembly.

The motor and gear box assembly includes a motion control motor 60 which is an AC variable frequency drive motor having a gear box 61 whose output shaft 59 has sprocket 58 keyed thereto. An encoder assembly 62 including an encoder gear drive is operatively connected to the shaft 54 for controlling angular movement of the shaft.

Figure 2:
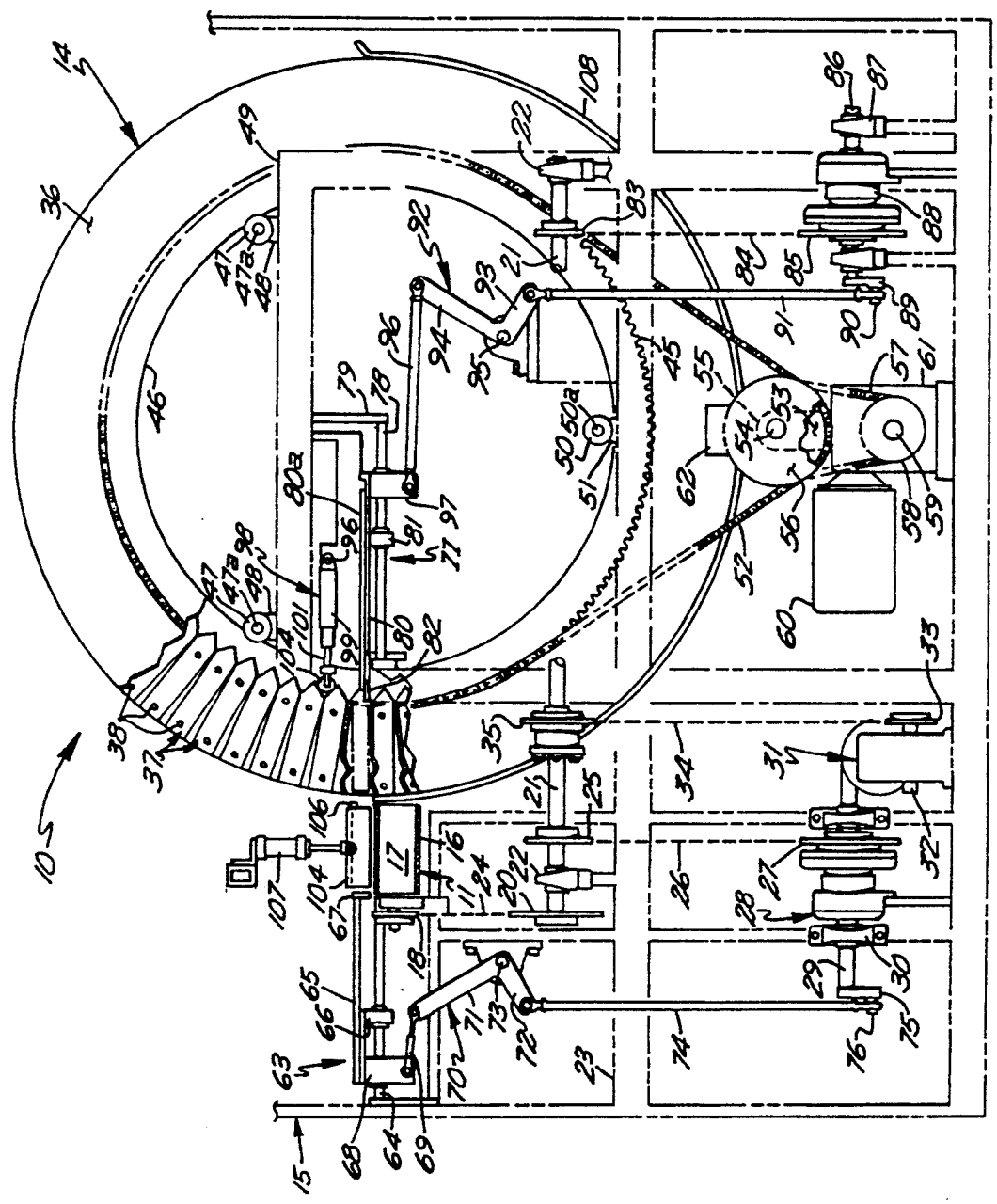
FIG. 2 is an end elevational view of the accumulator apparatus.

Means are provided for loading product P from the pass through conveyor 11 into the accumulator in a shelf-by-shelf sequence. This means includes a load accumulation pusher assembly 63 comprising a plurality of transversely extending horizontal guide shafts 64 located adjacent the pass through conveyor as best seen in FIG. 2. In the embodiment shown, there are three such horizontal shafts disposed in side-by-side relation and supported by frame elements of the support frame 15. The load accumulation pusher assembly 63 also includes a plurality (three) of generally rectangular, flat horizontal pusher plates 65 each being positioned above one of the guide shafts 64. Each pusher 65 has a pair of guide sleeves 66 secured to the lower surface thereof for engaging the associated guide shaft 64. The inner ends of the pusher plates 65 have an elongate vertically disposed pusher bar 67 rigidly affixed thereto and movable therewith. The pusher plates and pusher bar are reciprocated towards and away from the accumulator drum during the loading operation.

The load accumulation pusher assembly also includes a pair of connecting members 68 each being affixed to one of the outside pusher plates 65 and depending therefrom. One end of one elongate connecting rod 69 is pivotally connected to the lower end portion of a connecting member 68 and the other end of the connecting rod 69 is pivotally connected to the upper end of an L-shaped crank 70. The L-shaped crank 70 is comprised of an elongate crank arm 71 and a crank arm 72 arranged in right angular relationship with respect to each other. The crank arm 72 for each L-shaped crank 70 is secured to one end portion of an elongate longitudinally extending shaft 73 which is journaled in suitable pillow block bearings mounted on frame elements of the support frame 15. The shaft 73 interconnects the L-shaped cranks 70 for the outside pusher plates 65.

The free end of the crank arm 72 for one of the L-shaped cranks is pivotally connected to the upper end of an elongate connecting rod 74. The lower end portion of the elongate connecting rod is connected to a crank 75 secured to the end of shaft 49 by pivot 76. It will be seen that when the electric motor gear reduction assembly 31 is energized, shaft 29 will be rotated to not only operate the pass through conveyor but will also operate the load accumulation pusher assembly 63 to push a predetermined number of product from the pass through conveyor upon a shelf 37 of the accumulator drum 14 during each (forward) loading stroke.

Means are also provided for unloading product from the shelves of the accumulator drum 14 and this means includes an unload accumulation pusher assembly 77. The unload accumulation pusher assembly 77 includes a plurality of transversely extending, horizontal shafts 78 which are longitudinally spaced apart and which are positioned interiorly of the drum. The shafts are secured by mounting bars 79 to the frame members 49 which support the upper cam followers 47. The unload pusher assembly 77 also includes a plurality of generally rectangular transverse flat pusher plates 80 which are horizontally disposed and which are rigidly interconnected by an elongate generally rectangular shaped longitudinal plate 80a. The transverse pusher plates 80 each have guide sleeves 81 secured thereto and depending therefrom for accommodating one of the guide shafts 78 therethrough. The outer end of the pusher plates 80 are provided with a longitudinally extending disposed pusher bar 82. It will be seen that when the unload accumulator pusher assembly 77 is reciprocated, the pusher bar 82 will move product from each successive accumulator shelf 37 in an outward direction upon the pass through conveyor. Referring again to FIG. 3, it will be noted that the space between the end of the downturned lip and transverse wall of adjacent shelves permits pusher bar 82 and plates 80 to move the product from a shelf.

Means are provided for reciprocating the unload accumulator pusher assembly 77, and this means includes a sprocket 83 affixed to the shaft 21 adjacent one end thereof. An endless chain 84 is trained about sprocket 83 and about sprocket 85 keyed to a shaft 86. The shaft 86 is journaled in suitable pillow block bearings 87 supported on suitable frame elements of the support frame 15. The shaft 86 is also provided with a clutch-brake mechanism 88 similar to the clutch-brake mechanism 27 for the shaft 29.

The shaft 86 is also provided with a crank arm 89 at one end thereof and the crank arm is connected by a pivot 90 to the lower end of an elongate generally vertically disposed connecting rod 91. The upper end of the connecting rod 91 is pivotally connected to an L-shaped crank 92 including crank arm 93 and crank arm 94. In the embodiment shown, the connecting rod 91 is pivotally connected to the crank arm 93.

The L-shaped crank 92 is also pivoted to a shaft 95 which is secured to a similar crank arm 93 adjacent the other end portion of the drum. The shaft 95 is journaled in suitable pillow block bearings 95a, the pillow block bearings being mounted on suitable frame elements of the support frame 15. One end of one elongate connecting rod 96 is pivotally connected to the upper end of the crank arm 94. Each connecting rod 96 is also pivotally connected to one of a pair of arms 97 each of which is rigidly affixed and extend from one of the outer transverse pusher plates 80. It will be seen that the outer pusher plates for the unload pusher assembly 77 are interconnected by connecting rods 96 and the L-shaped crank to the shaft 95.

It will also be seen that when the shaft 86 is rotated, this torque is transmitted via the connecting rods and L-shaped cranks to the transverse pusher plates 80 and the pusher bar 82 to reciprocate the unload pusher assembly. During the forward stroke, the unload pusher assembly will engage and push product from its successive accumulator shelves 37 onto the pass through conveyor 11.

During loading or unloading of the accumulator drum, angular movement of the drum is interrupted to permit the loading or unloading of product to and from the accumulator shelves. Means are provided for accurately positioning the drum to permit efficient smooth loading or unloading of the accumulator shelves and this means includes a pair of shelf positioning ball and detent assemblies 98. It will be noted that these assemblies are each positioned adjacent one end of the drum and each includes a pair of double acting pnuematic cylinders 99. Each cylinder 99 is provided with a piston having a piston rod 101 secured thereto and movable in the cylinder. The outer end of each piston rod is provided with roller ball type detent 104. Each roller engages one of a pair of guides that guides horizontal movement of the roller or ball type detent 102 during extension and retraction of the piston rod.

When the movement of the drum is interrupted, the pnuematic cylinders are actuated to extend the piston rods thereof so that the roller and ball type detents 102 are shifted into engaging relation V-notch 37a define the pointed rear end portions of the side walls 40 of a pair of adjacent shelves 37. This engagement of the roller or ball type detent 104 with the inclined edges 42 of an adjacent pair of shelves positions each successive shelf for accurate loading or unloading via the load accumulation pusher assembly or the unload accumulation pusher assembly. Upon retraction, of the shelf positioning means, the drum is indexed to the next position for the subsequent loading or unloading step. It will be noted that ball detent 104 engages a pair of shelves 37 located above the specific shelf being loaded or unloaded.

Means are also provided for stopping movement of product on the pass through conveyors and this means includes a stop plate 104 which is located adjacent the downstream end of the accumulator drum 14. The stop plate 104 is secured to an arm 105 which in turn is pivotally connected to a suitable frame element to permit vertical swinging movement of the stop plate 104 between obstructing and non-obstructing relation with respect to product positioned on the pass through conveyor. A double acting pnuematic cylinder 107 is pivotally secured to a suitable frame member. It will be seen that when the piston rod of the double acting pnuematic cylinder 107 is extended, the stop plate 104 will be urged downwardly into obstructing relation with respect to product being moved by the pass through conveyor 11. When the piston rod is retracted, the stop plate will be raised and allow product to pass along on the pass through conveyor. When the accumulator drum 14 is loaded, the stop plate is moved downwardly to obstruct movement of the product while allowing the pass through conveyor to continue to operate. Product can then be loaded or unloaded into or from the accumulator drum.

During the operation of the accumulator apparatus 10, the pass through conveyor 11 will be operated in its conventional normal way to move product from an upstream source in a downstream direction where it will be discharged from the conveyor. In the event of a downstream stoppage, the accumulation drum 14 is rotated thereby presenting each successive shelf 37 for loading. During unloading of the accumulation drum, a product stop device upstream of the accumulation drum stops the incoming product P long enough to create an opening or gap in the normal product flow which corresponds to the size of a shelf full of product. After a shelf of product is pshed out onto the conveyor, the upstream stop device then releases and the accumulation system does not meter any more products on to the production line until the downstream equipment has processed the additional product fed onto the line during the last accumulator unload cycle.

It is also pointed out that when a downstream stoppage is detected, the stop plate 104 is shifted from an elevated position to a position obstructing movement of the product on the pass through conveyor. The load accumulation pusher assembly 63 will be actuated to move the pusher bar 67 towards the accumulator drum and thereby load a plurality of product items into an accumulator shelf 37. The drum will be indexed by the motion control motor 60 and encoder assembly to present the next adjacent shelf in aligned relation with the pass through conveyor for the next loading step.

In order to assure precise correct positioning, the positioning mechanisms 98 will be actuated thereby extending the piston rods 101 of the double acting pnuematic cylinders 99 to shift the roller or ball type detent 104 into the V-notch 37a defined by the pointed rear ends 42 of adjacent pairs of shelves 37. The load accumulation pusher assembly 63 will again be actuated to load the next shelf with product. It is pointed out that the stop plate is shifted downwardly to retain a predetermined number of product items in a position for loading of the product items into the accumulator shelf. Thus the stop plate 104 is shifted downwardly to stop movement of the product to allow for loading and is elevated or retracted until the product is moved again for loading the next adjacent shelf.

The accumulator shelves are successively loaded thereby smoothly and efficiently accumulating product during the downstream stoppage. It is pointed that a generally semi-cylindrical bottom pan 108 is positioned below the drum 14 and is mounted on the support frame to permit product from falling from the shelves during the downwardly moving arc of rotation of the accumulator shelves 37.

When the downstream stoppage problem has been resolved, the unload accumulator pusher assembly 77 is actuated to unload product from each successive shelf. In this regard, the encoder assembly 62 may be programmed to allow unloading of the product so that the first loaded shelf will be the first shelf unloaded. The encoder assembly remembers the order in which the shelves are loaded and then permits unloading in the first in first out (FIFO) manner. It is also pointed out that the unloading mode may be operated in the more traditional last in first out (LIFO) manner of operation.

In any event, the unload accumulator pusher assembly 77 will be actuated to push product from each accumulator shelf 37 upon the pass through conveyor. It is again pointed out that the positioning mechanisms 98 will be actuated during each unloading step to properly position and retain the shelf to be unloaded in the desired position with respect to the pass through conveyor.

It is pointed out that operation of the accumulator apparatus permits smooth acceleration and decceleration since the motion control drive (AC variable frequency drive motor 60) is used as the power source for rotating the drum. The use of the cam follower rollers for supporting the drum allows the ends of the drum to be open to facilitate mounting of the unloading pusher mechanism and also allows easy access for maintenance of the various components located interiorly of the drum.

It will therefore be seen that the present invention is directed to a novel accumulation apparatus which permits ready loading and unloading of the product from an accumulation drum in a manner completely different from any known prior art system.

What is claimed is:

1. An accumulator apparatus for accumulating product from a production line conveyor when a downstream stoppage occurs, said apparatus comprising,
   a horizontal pass through conveyor for supplying product from a source to a discharge station,
   a cylindrical drum including a plurality of similar product supporting shelves, means securing said shelves in substantially side-by-side cylindrical relation, said drum being positioned in close proximal relation to said conveyor,
   means for rotating said drum about its axis, said rotational axis of the drum being disposed substantially parallel to the direction of movement of said conveyor,
   shiftable positioning means shiftable into and out of engaging relation with a pair of adjacent shelves to position each successive shelf to receive product from the conveyor or to unload product from the shelf upon the conveyor,
   shiftable stop means adjacent said conveyor shiftable into and out of obstructing relation with respect to product on said conveyor,
   shiftable loading means adjacent said conveyor and being shiftable to engage and load product from the conveyor upon each shelf as each shelf is moved to a loading position,
   and unloading means positioned interiorly of said drum and being shiftable to unload product from each successive shelf upon the conveyor as each shelf is rotated to an unloading position.

2. The accumulator apparatus as defined in claim 1 and means engaging and supporting said drum for rotation about its rotational axis, said drum engaging and supporting means comprising a plurality of cam follower rollers located at each end of the drum.

3. The accumulator apparatus as defined in claim 1 wherein said means for rotating said drum indexes said drum through incremental angles of movement to successively dispose each shelf for loading product from and unloading product upon said pass through conveyor.

4. The accumulation apparatus as defined in claim 1 wherein said product supporting shelves have inner ends, said inner ends of adjacent shelves defining V-shaped notches, said positioning means engaging in the V-shaped notch of a pair of adjacent shelves to position one of said shelves for loading product upon or unloading product from said one shelf.

5. The accumulator as defined in claim 1 wherein said positioning means is positioned interiorly of said drum.

* * * * *